United States Patent
Raja Jayaraman (10) Patent No.: US 12,236,258 B2
(45) Date of Patent: Feb. 25, 2025

(54) BROWSER-DRIVEN CAPTURE OF APPLICATION INSTALLATIONS FOR APPLICATION VIRTUALIZATION

(71) Applicant: Omnissa, LLC, Mountain View, CA (US)

(72) Inventor: Vignesh Raja Jayaraman, Palo Alto, CA (US)

(73) Assignee: Omnissa, LLC, Mountain View, CA (US)

( * ) Notice: Subject to any disclaimer, the term of this patent is extended or adjusted under 35 U.S.C. 154(b) by 10 days.

(21) Appl. No.: 18/086,174

(22) Filed: Dec. 21, 2022

(65) Prior Publication Data

US 2023/0123054 A1   Apr. 20, 2023

Related U.S. Application Data

(63) Continuation of application No. 16/412,651, filed on May 15, 2019, now Pat. No. 11,561,814.

(51) Int. Cl.
*G06F 9/455*    (2018.01)
*G06F 8/61*     (2018.01)

(52) U.S. Cl.
CPC ............ *G06F 9/45558* (2013.01); *G06F 8/61* (2013.01); *G06F 2009/45591* (2013.01)

(58) Field of Classification Search
CPC ................... G06F 2009/45591; G06F 9/45558
See application file for complete search history.

(56) References Cited

U.S. PATENT DOCUMENTS

| 2016/0124663 | A1* | 5/2016 | Mitkar | G06F 16/1748 |
| | | | | 711/162 |
| 2018/0032731 | A1* | 2/2018 | De | G06F 21/563 |
| 2019/0140905 | A1* | 5/2019 | Vembuli | H04L 41/0889 |

* cited by examiner

*Primary Examiner* — Sisley N Kim
(74) *Attorney, Agent, or Firm* — Kim & Stewart LLP (57) ABSTRACT

Techniques are described for performing browser-driven application capture of application installations. When the browser on the client machine detects a request to begin an application capture session, it downloads an orchestrator binary from an origin server. The orchestrator is a self-extracting executable that decompresses components responsible for preparing the client machine for the application capture session. Preparing the client machine includes starting a local web server, executing a registry script to create the necessary registry state, mounting a virtual disk, and deploying an agent that will record state changes on the client machine. Once the client machine has been prepared, the application installation can begin. During the installation process, the agent intercepts state changes occurring on the client machine and redirects them to the virtual disk. Once finished, the application capture session is completed by adding identity and metadata information to the virtual disk to generate the application package.

19 Claims, 7 Drawing Sheets

BROWSER-DRIVEN CAPTURE OF APPLICATION INSTALLATIONS FOR APPLICATION VIRTUALIZATION

CLAIM OF PRIORITY

This application is continuation of and claims priority to U.S. patent application Ser. No. 16/412,651 entitled "BROWSER-DRIVEN CAPTURE OF APPLICATION INSTALLATIONS FOR APPLICATION VIRTUALIZATION" filed on May 15, 2019, and issued as U.S. Pat. No. 11,561,814 on Jan. 24, 2023, the entirety of which is incorporated by reference herein.

TECHNICAL FIELD

The present disclosure generally relates to application virtualization and more specifically to capturing application installations using web-based and browser-driven methods.

BACKGROUND

Application virtualization ("app virtualization") is a technology that isolates and encapsulates a software application from the operating system on which it is executed. This provides a number of benefits, such as making an application more portable, the ability to execute the application without going through a lengthy installation process, and improved security due to less integration with the underlying operating system. There are numerous different application virtualization solutions available on the market, including VMware App Volumes, VMware ThinApp, Microsoft App-V, and Citrix XenApp, among others.

Typically, application virtualization technology implements a virtualization layer between a native application (e.g. Microsoft Windows application) and the underlying operating system. While presenting a virtualized view of the operating system's resources to the application, this layer may optionally implement a container for the application's static and dynamic state, isolating the application from underlying system state and/or the state of other concurrently running applications. During execution, when an application attempts to retrieve state or operate a system resource by exercising operating system interfaces, the virtualization layer intercepts the call and presents an emulated and/or local containerized version of the state or resource, if present within the application container. Alternatively, it may present a merged view of the local and underlying system state, based on policy. If no local, containerized state or resource exists, the virtualization layer may report back a resource-not-found error to the application or return the underlying system resource, again based on policy. System resources like the file system, registry, processes, synchronization objects, network transport-layer ports and shared-memory objects are all examples of state or resources that an application uses during its execution. If an application attempts to modify state, the virtualization layer can store the modification within the container, returning it back on the next read and discarding it eventually on application exit or performing a write-through, persisting it onto the base system, based on state or resource-specific policy.

Application virtualization enables applications to execute without requiring prior registration or installation with the operating system and to concurrently execute alongside different versions of the same application without resource or naming conflicts. It also enables applications to be introduced and removed from the system dynamically. One use case in which this capability proves very useful is when presenting applications to users in virtual desktop infrastructure (VDI) environments where the base operating system, storage disks and applications are custom-built and dynamically combined on-demand for a specific user, when the user requests a logon session.

In order to virtualize the application such that it can operate under the virtualization layer, the application must first be captured and packaged into a container. Conventionally, this was performed by utilizing a clean "capture machine" (e.g. a virtual machine) to install an application and then comparing the pre-installation state of the capture machine with the post-installation state to determine which changes have been made during installation. This process is tedious and is normally performed by an administrator because it requires setting up a separate capture machine with capturing software that includes local system components such as agents, services and drivers, which must be installed, configured and integrated to initiate, control, monitor and complete a capturing session. Additionally, the captured application packages are often tightly coupled to operating with specific proprietary tools and formats that were used to create the package, which impedes their utilization and portability to other systems. Improved techniques for performing application capture are needed.

DETAILED DESCRIPTION

Systems and methods in accordance with various embodiments of the present disclosure overcome at least some of the above-mentioned shortcomings and deficiencies by providing a browser-driven capture method for capturing application installations that does not require a lengthy and complex process of setting up and configuring a separate dedicated capture machine with capturing software. The application capture can be initialized from a web page or web portal displayed by a browser that presents a catalog of software-as-a-service applications and remote applications available to the user. Under this approach, the need for specific infrastructure components (such as a hypervisor to host the capture virtual machine, a controller web-application hosted on a webserver to control the capturing software, hypervisor-attached or network-attached storage, an identity server for authenticating and authorizing participant workflows) and the roles they play (such as machine management, initialization, user-interface, workflow-coordination, storage and identity), are removed from the application capture workflow.

In various embodiments, a user seeking to perform an application capture can click on the user interface component displayed on the web page or web portal displayed by a browser on their local client machine (e.g. laptop, PC, or other computing device). When the web browser on the client machine detects the request to begin an application capture session, it first downloads an orchestrator binary executable linked on the web page from an origin server to the client machine. The orchestrator is a self-extracting executable that decompresses and unpacks a set of components packaged inside which will be responsible for preparing the client machine for the application capture session. These components will be described in more detail later in this specification.

In various embodiments, preparing the client machine for the application capture involves a number of operations, including starting a local web server that will work in conjunction with the web browser during the application capture, executing a registry script to create the necessary registry state for the application capture, mounting a virtual disk on the client machine, and deploying an agent that will record state changes on the client machine. These operations, are initiated and entirely controlled by code, delivered just-in-time as part of the webpage served by the origin server and running locally inside the browser. Once the client machine has been prepared for application capture, the user may click on a user-interface element labeled "Begin Capture" on the webpage (the user-interface is entirely hosted and controlled by code embedded in the web page) or otherwise indicate that the user is ready to capture an application by launching the application's installation process on the client machine.

When the agent detects that the application installation has started, the agent begins intercepting state changes occurring on the client machine during the application installation process. These state changes (e.g. file I/O operations) are redirected and stored in the virtual disk (e.g. VHD) mounted on the client machine as they are occurring. When the application installation has finished, the user can indicate completion by selecting the corresponding user interface element. The application capture session is then completed by finalizing the virtual disk wherein identity and metadata information is added to the virtual disk, thereby generating an application package that is capable of being deployed to other computing devices.

Figure 1:
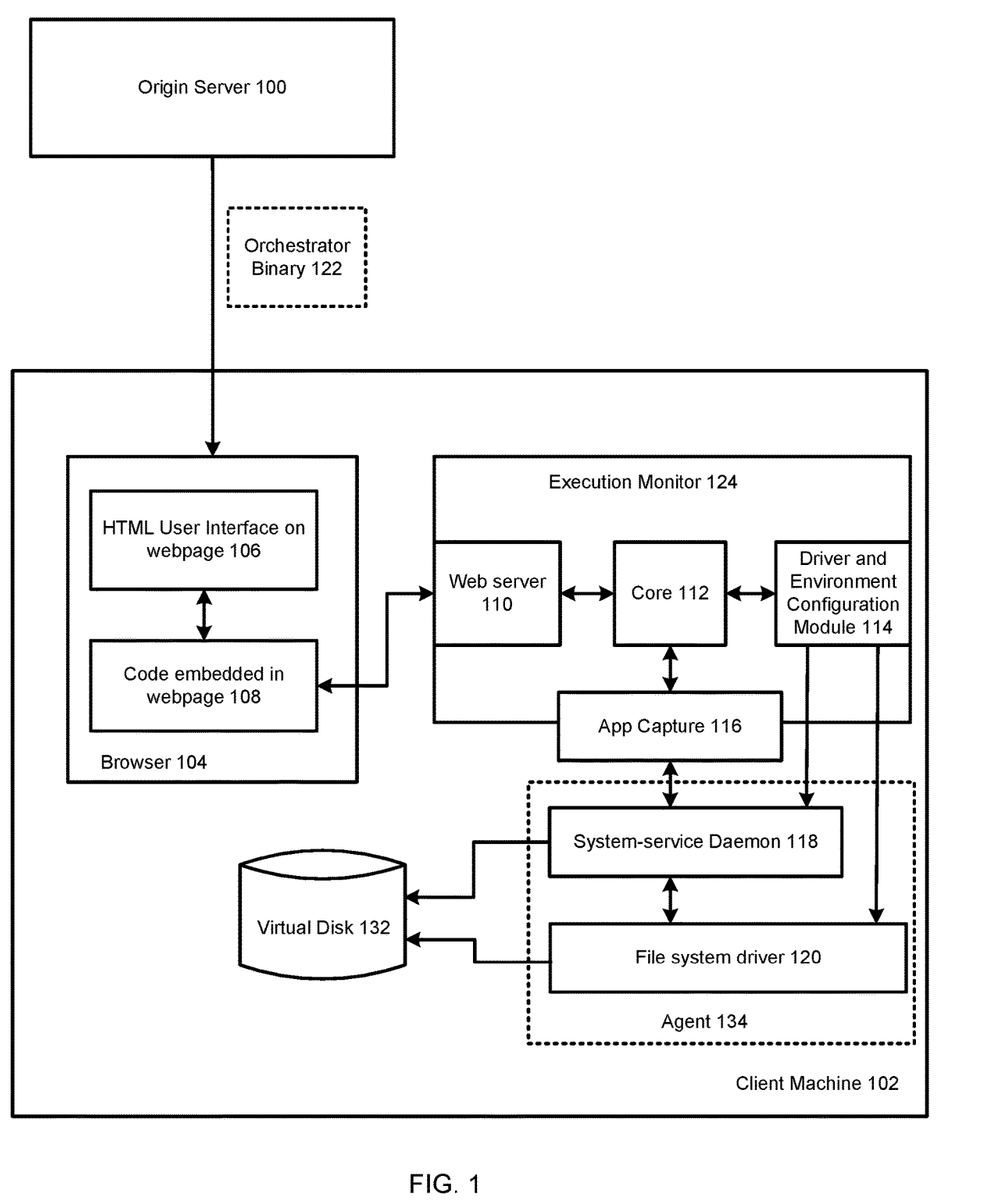
FIG. 1 illustrates an example of a system that can perform browser-driven application capture of application installations, in accordance with various embodiments.

FIG. 1 illustrates an example of a system that can perform browser-driven application capture of application installations, in accordance with various embodiments. In the illustrated example, the request to start an application capture session is initiated on a web browser 104 displaying a user interface 106 (e.g. a web page or web portal) where users can access a catalog of web applications and/or remote applications. Modern applications are increasingly being deployed under the Software-as-a-Service (SAAS) model where software is implemented as a web application and accessed online via a web browser rather than licensed, installed and configured on individual computers. As such, many enterprises provide a web portal where users can access pre-configured SaaS applications and remote-desktop applications from an enterprise catalog, integrated with single sign-on authentication and authorization capabilities. The web portal is usually displayed by a web browser 104 operating on the user's client machine 102, such as a laptop, PC or other computing device, after the client machine 102 has been properly authenticated and the user has logged on. After logon, the web browser 104 may display the catalog of applications as individual tiles on the UI 106, which the user may click on to begin using the corresponding application.

Figure 5:
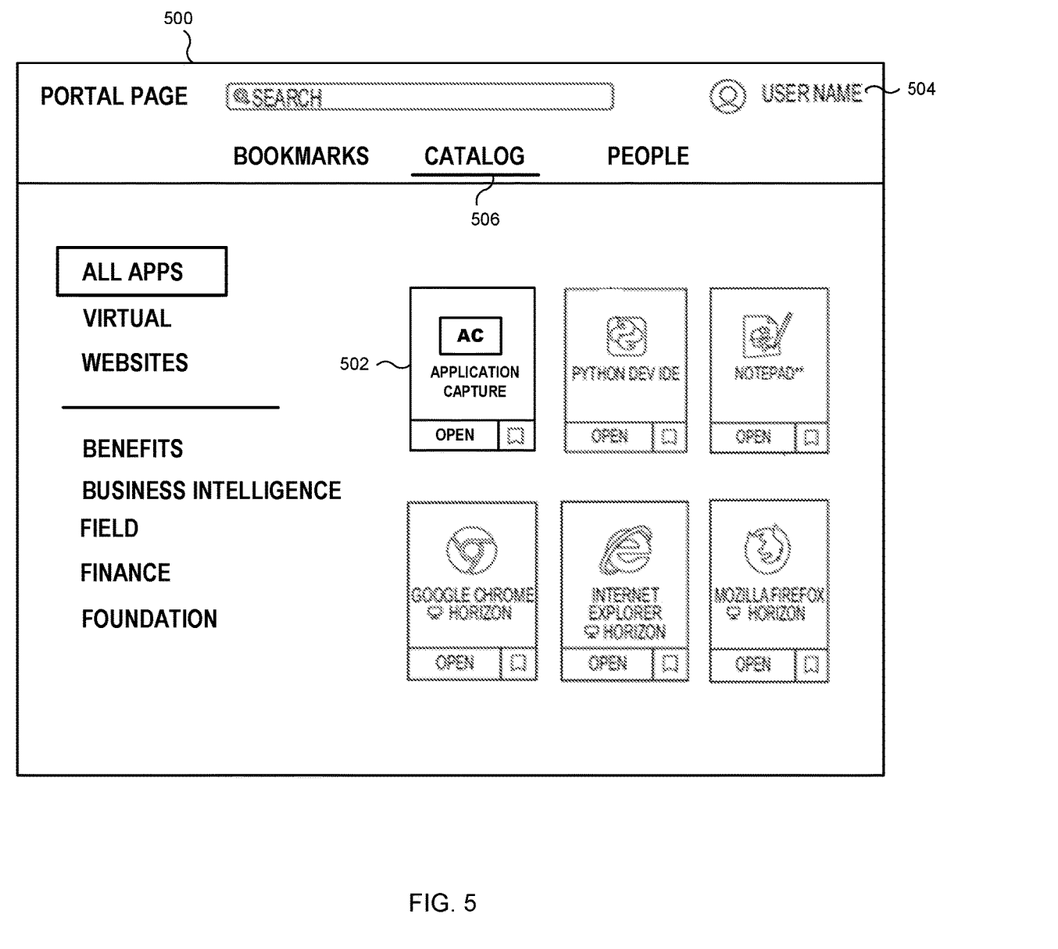
FIG. 5 illustrates an example of the web portal page that displays a catalog of applications, in accordance with various embodiments.

FIG. 5 illustrates an example of the web portal page that displays a catalog of applications, in accordance with various embodiments. As illustrated in FIG. 5, when a user logs into the portal page 500 using their username 504 and password or via single sign-on (SSO) capabilities, a catalog 506 of applications that is available to the user is displayed on the portal page 500. The applications may include software-as-a-service (SaaS) application, web applications or remoted applications, such as those delivered using virtual desktop infrastructure (VDI) technologies. Each application is displayed in a corresponding tile or other user interface (UI) element which allows the user to access the application. One of the applications in the catalog 506 is the "Application Capture" tile 502 which can be selected by the user to begin the application capture session on their client machine.

Figure 6:
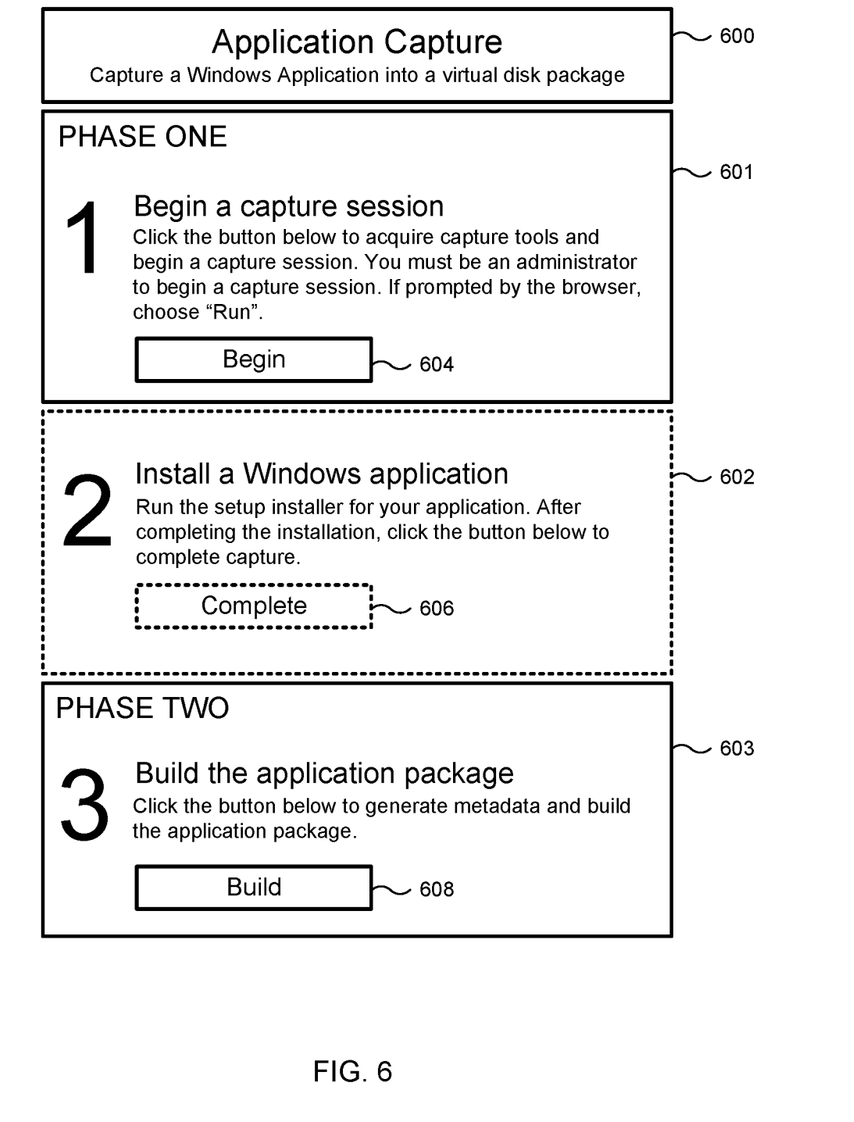
FIG. 6 illustrates an example of the application capture webpage that can be used to drive the various phases of the application capture session.

To start the process, the user seeking to perform an application capture visits the portal page and clicks on the "Application Capture" tile 502 or otherwise invokes the portion of the user interface 106 corresponding to the capture process. Upon clicking the tile, the user can be presented with the Application Capture webpage. This page is not a frontend for a web-application running at the back-end on the origin server 100. In one embodiment, there is no requirement for server-side logic, control or code running on the origin server 100. The displayed web page 106 may be standard web HTML, along with code 108 (e.g. JavaScript) embedded in the web page that executes entirely within the web browser 104. FIG. 6 illustrates an example of the application capture webpage 600 that can be used to drive the various phases of the application capture session. As shown in FIG. 6, the application capture session can be separated into two distinct phases—PHASE ONE which includes step 1 (601) and step 2 (602) and PHASE TWO which includes step 3 (603). The user may navigate through the application capture process using the buttons (604, 606, 608) associated with each phase and step as they become activated.

At this point, the user may begin the PHASE ONE of the application capture process by clicking a "Begin" button 604 (or similar UI component). Referring now back to FIG. 1, in response to starting this first phase, an orchestrator binary executable 122 is downloaded from the origin server 100 and executed. In one embodiment, the orchestrator binary 122 is a self-extracting Windows executable that decompresses and unpacks a set of constituent elements packaged inside it, which include the execution monitor 124, a web server 110, core 112 (this is a module within the execution monitor 124), driver and environment configuration module 114, application capture executable 116, a template virtual disk file 132, and an agent 134 which is comprised of the system-service daemon 118 and a file system driver 120. The orchestrator 122 then copies over the constituent elements to appropriate locations on the client machine 102 and prepares the client machine 102 for the application capture. Preparing the client machine 102 includes, among other operations, configuring and starting the agent 134 and launching the application capture executable 116 which is configured to interface with the agent 134 (i.e. the system service daemon 118 and the file system driver 120) in order to initiate and end the application capture process. In various embodiments, the agent 134 will be responsible for intercepting any state changes occurring on the client machine 102 during the application installation and redirecting them to be stored on the virtual disk 132. Once the preparation is complete, the orchestrator 122 may execute silently without any additional input from the user-interface and communicates with the browser 104 for command and control. During the preparation stage of the client machine 102, the user may be shown feedback and progress messages within the browser page 106.

After the client machine 102 has been prepared for application capture, the second step (602) of PHASE ONE can be activated, where the user installs an application (e.g. Windows application) on the client machine 102 by running its installer. During the application installation process, the agent 134 captures the ongoing installation activity and redirects it into the virtual disk 132 mounted on the client machine 102. This is performed by intercepting file input/output (I/O) operations being executed by the application installer on the file system and redirecting these operations to be stored on the capture virtual disk. In one embodiment, the virtual disk 132 is in the Virtual Hard Disk (VHD) format, however other formats can easily be utilized, such as the Virtual Machine Disk (VMDK) or the like. After the installation is complete, the user clicks the "Complete" button 606 or other UI element indicating completion of the application installation. This commands the execution monitor 124 (which was packaged inside the orchestrator 122) to initiate a wrap-up of the application capture session, prepare the client machine 102 for a restart (which in some cases is necessary in order to complete capturing all of the components of the application) and then automatically causes the client machine 102 to restart.

After the client machine 102 has restarted, the user can once again launch the web browser 104 to display the web portal containing the catalog page and invoke the Application Capture tile 502, as previously discussed with reference to FIG. 5. In response to this, the orchestrator 122 is launched once again, but this time it detects a prior capture session in progress and enables PHASE TWO (603) of the application capture process, as previously discussed with reference to FIG. 6. In this PHASE TWO 603, the user clicks on the "Build the Application Package" button 608 (or similar UI component) to prepare the virtual disk and finalize it by adding identity and metadata information to create the application package. Once that is finished, the virtual disk can be uploaded onto a suitable on-premises or cloud storage-service for subsequent entitlement and delivery to end-users on other client machines. The execution monitor 124 may then delete and clean up all artifacts including parts of the agent from the client machine 102, before exiting silently.

Figure 2:
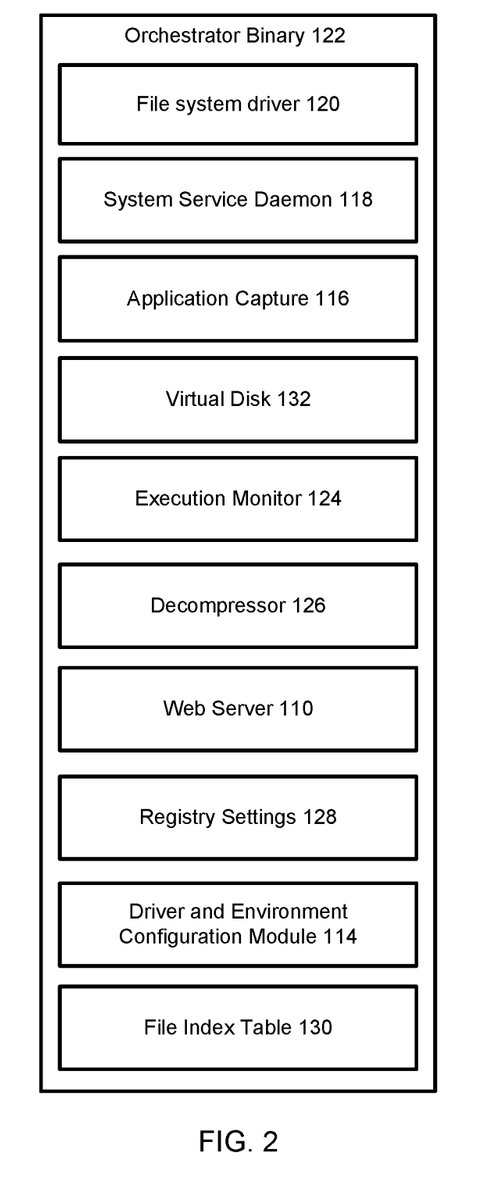
FIG. 2 illustrates an example of the contents of the orchestrator binary executable that is used to perform the browser-driven application capture, in accordance with various embodiments.

FIG. 2 illustrates an example of the contents of the orchestrator binary executable that is used to perform the browser-driven application capture, in accordance with various embodiments. In various embodiments, the orchestrator binary 122 is constructed as a self-extracting executable. A number of constituent components are then compressed and appended to the orchestrator binary executable file, as payload. The file-index table 130 is updated with the location and size of each component within the orchestrator binary file 122 and the file-index table is appended to the orchestrator file 122. The file-index table 130 is an index structure that informs the bootstrap code in the orchestrator binary 122 about the location and size of each component within the binary's payload area. The payload of the orchestrator binary can be decompressed using any decompressor 126 available on the market, such as the LZMA decompressor executable.

In various embodiments, the orchestrator binary executable file 122 includes the agent responsible for intercepting the various state changes and other activity performed during the application installation and redirecting them to the virtual disk. The agent is comprised of a file system driver 120 and the system service daemon 118. The file system driver 120 intercepts the application's install-time filesystem and registry operations and redirects and stores the state changes of those operations in the virtual disk. The system service daemon 118 interfaces with the file system driver 120 in order to perform the interception and redirection actions. The orchestrator binary 122 further includes an application capture executable 116 which interfaces with the file system driver 120 and the system service daemon 118 in order to initiate and end the application capture process. In addition, the orchestrator binary 122 includes a virtual disk image 132 that will eventually become the application package disk after the capture session has completed.

The payload of the orchestrator binary 122 further includes an execution monitor 124, which monitors the web browser-driven application capture workflow and loads the local web server 110 through which the execution monitor 124 receives commands from page code 108 on the web browser 104, which is running on the client machine 102 and facing the user. The execution monitor 124 responds to these commands by interfacing with the application capture executable 116, the web server 110, the registry settings file 128 and the driver and environment configuration module 114 in order to execute the application capture workflow forward. The application capture executable 116 communicates back with code 108 on the web browser, via the execution monitor 124 and web server 110, and is configured to execute the actions specified by the user input on the browser, such as "Begin Capture Session", "Build Application Package" and the like.

The web server 110 can be written using the Berkeley Software Distribution (BSD) Sockets API library that receives HTTP requests from the web browser and responds with a specially-constructed script block that executes on the browser page. In one embodiment, the standard same-origin-policy (SOP) security policy, implemented in web browsers, prevents code on the webpage from making API requests to a web server that is not the origin server. In this case, the origin server 100 is the server that served the application capture webpage, while the server the page code 108 is making requests to, is the local web server 110 running on the same client machine, as implemented by this module. In order to work around the SOP, a mechanism can be used to conduct request-reply exchanges with the local web server 110. This mechanism will be described later in this specification, with reference to FIG. 3.

The payload of the orchestrator binary 122 further includes a registry settings file 128. This file contains special Windows registry settings that temporarily configure the file system driver 120 and the system service daemon 118 for correct operation. The registry settings file 128 also includes instructions for removing the settings and restoring the system registry to the previous state.

The driver and environment configuration module 114 of the orchestrator binary 122 is responsible for placing the file system driver 120 and the system service daemon 118 in the required system path locations, executing the registry settings file 128 to configure the aforementioned driver and daemon, and instructing the operating system (OS) to start the file system driver 120 and the system service daemon 118 as services, thereby activating them. The driver and environment configuration module 114 also includes the code to undo the above operations, with the aid of instructions listed in the registry settings file 128, in order to restore the previous state of the system on the client machine.

Referring now back to FIG. 1, when a user clicks on the "Application Capture" tile or other UI element, the web browser 104 navigates to the application capture webpage 600 and this causes the script code 108 on the page to be notified of the page load by the browser 104. The script code 108 then automatically navigates to an embedded link that causes the browser 104 to download the orchestrator executable binary 122.

The orchestrator executable 122 first reads the file-index table 130 stored in the last section of its payload, and individually reads and extracts the components of the payload onto temporary storage on the client machine. It then launches the decompressor 126, to decompress the individual components to their original form. The orchestrator executable 122 then launches the execution monitor 124 as a child process and exits. The execution monitor 124 then begins to prepare the client machine 102 for application capture.

In one embodiment, to prepare the client machine 102 for the application capture session, the execution monitor 124 performs the following sequence of actions:

a. Starts the local web server 110 on a separate thread (code on the web page 108 continually requests status updates from this web server 110).
  b. Executes the registry settings script 128 to create the registry state necessary for the other components to function.
  c. Executes the driver and environment configuration module 114 to register and start the file system driver 120 and the system service daemon 118, waits for their initialization to complete and then activates both.
  d. Communicates status updates back to page code 108 through the web server 110 so that the user is provided feedback on the ongoing preparation sequence, on web page 106.

After all components are initialized and ready, the execution monitor 124 returns a "ready" status update to the code embedded on the web page 108 (e.g. JavaScript code) in the browser 104, which in turn enables the "Begin" button 604 or other UI element to proceed to the next step of the application capture. The user may then click on the "Begin" button 604 to initiate an application capture. This click is communicated through the code embedded on the webpage 108, to the web server 110, which in turn communicates this to the execution monitor 124. The execution monitor 124 then commands the application capture executable 116 to begin a capture session. The application capture executable 116 then locates and mounts the virtual disk image file as a storage disk of client machine 102. The filesystem driver 120, as part of its configuration, subscribes with the operating system (OS) of the client machine 102 for new-disk notifications. Accordingly, when a new virtual disk is mounted on the system, the OS notifies the filesystem driver 120 of the new virtual disk. The driver 120 introspects the virtual disk and activates its virtualization layer on the system. This event is communicated back to the execution monitor 124 through the system-service daemon 118 and the application capture executable 116. The execution monitor 124 communicates this back to the code embedded on the webpage 108, which in turn enables the second step 602 of PHASE ONE, prompting the user to begin installing an application.

At the second step 602 of PHASE ONE, the user is prompted to begin installing the application on the client machine 102. The user executes the application's installer and as the application installs, the parts of the agent (system service daemon 118 and file system driver 120) capture the ongoing installation activity into a package disk (e.g. in the Microsoft's Virtual Hard Disk (VHD) format). After the installation is complete, the user clicks the "Complete" button 606 or other UI element. This instructs the execution monitor 124 to initiate a wrap-up of the capture session, prepares the client machine 102 for a restart and then automatically causes the client machine 102 to restart.

After the client machine 102 has restarted, the user visits the webpage 500 again and invokes the Application Capture tile 502 or other UI element to continue the application capture session. The application capture webpage 600 reappears, and the orchestrator 122 is launched once again, but this time, it detects a prior capture session in progress (from session state stored on the client machine 102 in PHASE ONE). The execution monitor 124 starts and activates the agent's service 118 and driver 120 components and then enables PHASE TWO 603. The user then clicks on the "Build" button 608 or other UI element. This commands the execution monitor 124 to instruct the application capture executable 116 to mount the capture virtual disk and finalize it by adding identity and metadata information, thus creating an application package disk. After the build is complete, the code-on-webpage 108, instructs the execution monitor 124 to close the capture session. The execution monitor 124 then deactivates and shuts down the system service daemon 118 and the file system driver 120. The driver and environment configuration module 114 is then commanded to deregister and delete all prior configuration entries on the system. The execution monitor 124 then deletes and cleans up all artifacts including parts of the agent—the system-service daemon 118 and filesystem driver 120—and miscellaneous files (log files). The embedded web server 110 is then shut down and the execution monitor 124 finally instructs the operating system's Task Scheduler (TS) service to delete its own (the execution monitor's 124) executable image file after a period of time (e.g. two seconds later), and immediately exits. The TS service, after the period of time expires, deletes the execution monitor executable file.

Figure 3:
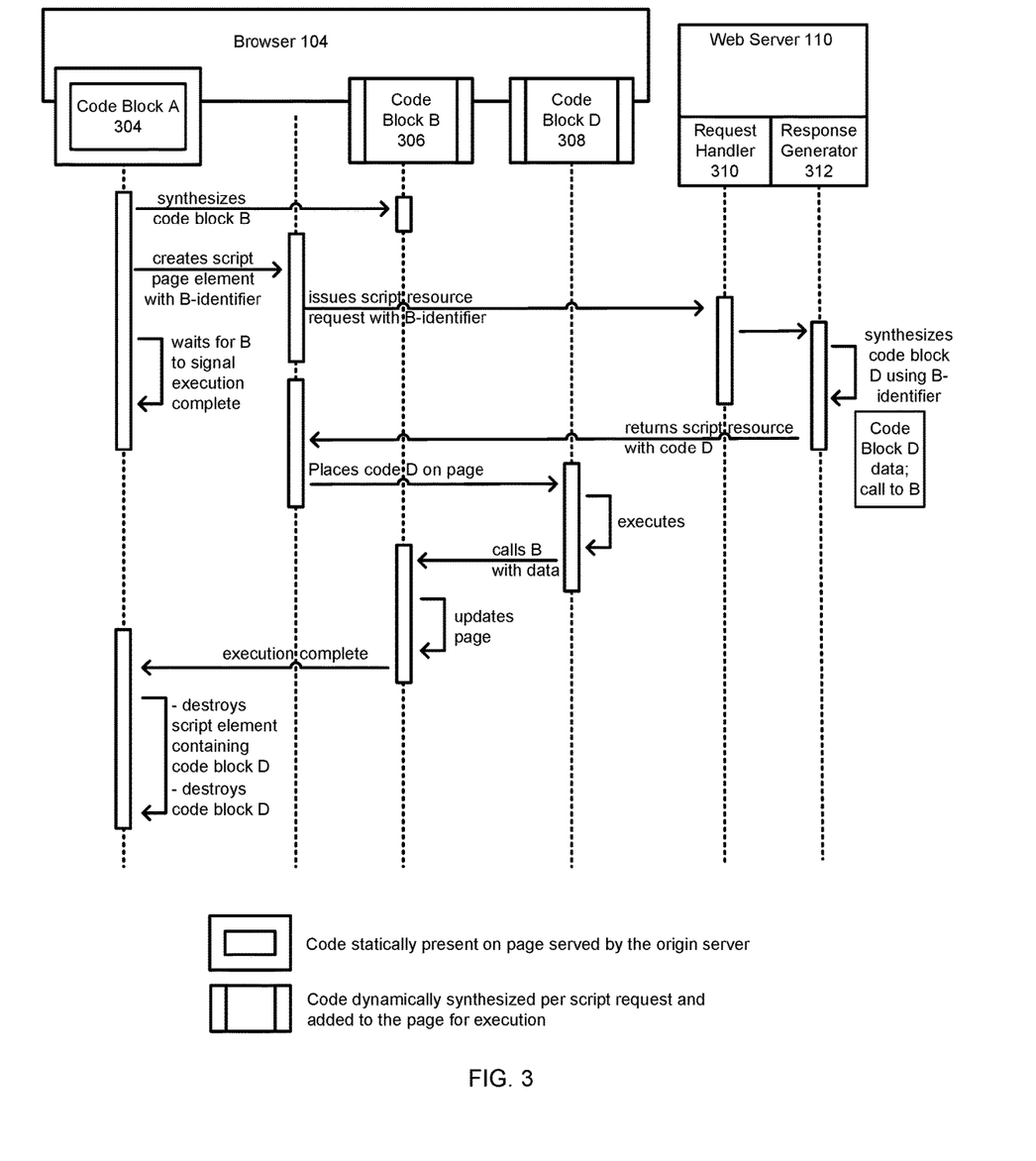
FIG. 3 illustrates an example of the interaction between code embedded on the webpage and the execution monitor during the application capture, in accordance with various embodiments.

FIG. 3 illustrates an example of the interaction between code embedded on the webpage and the execution monitor during the application capture, in accordance with various embodiments. Many modern web browsers implement a standard web-content security policy called the same-origin-policy (SOP). After a page loads in the browser 104, JavaScript code in the browser can implement in-place retrieval and/or updates of dynamic information on the page by making AJAX (Asynchronous JavaScript and XML) or XHR (XMLHttpRequest) requests. These enable HTTP requests to be made to a different resource URL and responses therefrom to be received and processed, with the browser 104 staying at the current page URL and not having to navigate away from the current page URL to the resource URL. For instance, a commercial organization's homepage could have a section displaying its NYSE stock price retrieved from a different resource URL, that is updated every minute to its current value, while the browser stays on the homepage URL. The SOP however requires the page URL and resource URL to have the same origin. In other words, the browser implementing such a policy would prevent code on the page URL from interacting with a resource URL from another origin. In this context, the origin usually constitutes the triple of (protocol, host and port number). Two URLs have the same origin if they have the same triple. For example, with a URL represented as [protocol]://[host]:[port], code on a page served from http://www.a.com:80, could not make AJAX/XHR requests to retrieve data from http://www.b.com:80.

In the illustrated embodiment, the browser 104 displays the application capture webpage from the page URL (e.g., https://appcapture.com) and the code on the webpage 108 is trying to issue requests to the web server 110 embedded within the execution monitor 124. This web server 110 might be running locally at a different URL (e.g., http://127.0.0.1/appcapture). Because the origins are different, the browser's SOP would normally prevent the aforesaid request from executing. To bypass the SOP and effect the required interaction, the present disclosure implements a mechanism illustrated in FIG. 3.

The browser's SOP does not apply for static resources like images and scripts. The embodiment illustrated in FIG. 3 takes advantage of this fact by making requests for script resources, rather than dynamic data resources through AJAX/XHR. When the execution monitor's web server 110 receives a script request from the browser 104, it returns a specially constructed script response that carries a data payload. As illustrated in FIG. 3, the sequence of steps can be implemented as follows:

1. Code on the web page in Block A (304) dynamically synthesizes a new code block B 306 (e.g. a JavaScript function) with a new random identifier (e.g. B-identifier).
2. Code block A (304) then creates a new HTML <script> element and injects it into the web page's Document Object Model (DOM) tree. The <script> element's source URL is set to point to the execution monitor's web server 110, that listens for and accepts requests addressed to a specific source URL (e.g. http://127.0.0.1/appcapture/B-id/request-type?parameters).
3. This triggers the browser 104 to process the new <script> element and issue a script resource request to the source URL, i.e. to the request handler 310 of the web server 110.
4. Code block A 304 then waits for Code block B 306 to signal completion of execution, by periodically polling code block B (306)'s state.
5. Steps 1-3 are executed upon each time interval (e.g. once every second), each time with a new random B-identifier.
6. The web server's 110 request handler code 310, inspects the request URL and interprets the request-type and its parameters. The request-type covers different aspects of the capture process like (a) the status of the different components of the execution monitor 124, (b) commands to be sent to any of application capture executable 116, the system-service daemon 118 or the filesystem driver 120, through the execution monitor core 112 and (c) commands to read messages, status or data enqueued in an internal queue, by any of application capture executable 116, system-service daemon 118 or filesystem driver 120. When any of the aforesaid components need a specific state, message or action to be effected on the web page 106, in the browser 104, they place a command in the internal queue, which is placed as the response payload in Step 8.
7. The request handler 310 calls the response generator 312 of the web server 110 with the required parameters. The response generator 312 then prepares the appropriate response, gathering data from the internal queue and external state (such as the state of the application being installed and state of the capture virtual disk 132).
8. The response generator 312 dynamically synthesizes a new code block (a JavaScript function—code block D 308, containing the data of Step 7 as a lexically-closed payload. The JavaScript language environment supports the functional-programming paradigm, where data can be name-bound to a function's lexical scope at definition time, instead of having to pass the data as arguments in a call to the function at execution time. This facility is called lexical-closure). The response generator 312 then returns the script resource with code block D to the web browser 104.
9. The web browser 104 receives the response to its request of Step 3, and the response being a script block, proceeds to execute the code block D 308.
10. Code block D 308 executes, in the page, and calls code block B 306 that still exists on the page, passing in code block D's lexically closed data, as arguments into Block B's JavaScript function.
11. After code block B 306 completes execution, code block A 304 gets notified and then cleans up by deleting code block B 306 and code block D 308.
12. As indicated in Step 5, each execution of Steps 1-3 (e.g. once every second) constitutes one exchange, identified by B-identifier. The completion of each exchange (steps 6-11), can occur out-of-order, and is individually tracked, matched and reconciled by code block A 304.

The afore-described communication between the code embedded in the webpage 108 on the browser 104 and the web server 110 module embedded in the execution monitor 124 can be utilized to work around the restrictions of the browser's same-origin-policy (SOP) and provide for browser-driven command-and-control of the execution monitor 124 and its underlying components.

Figure 4:
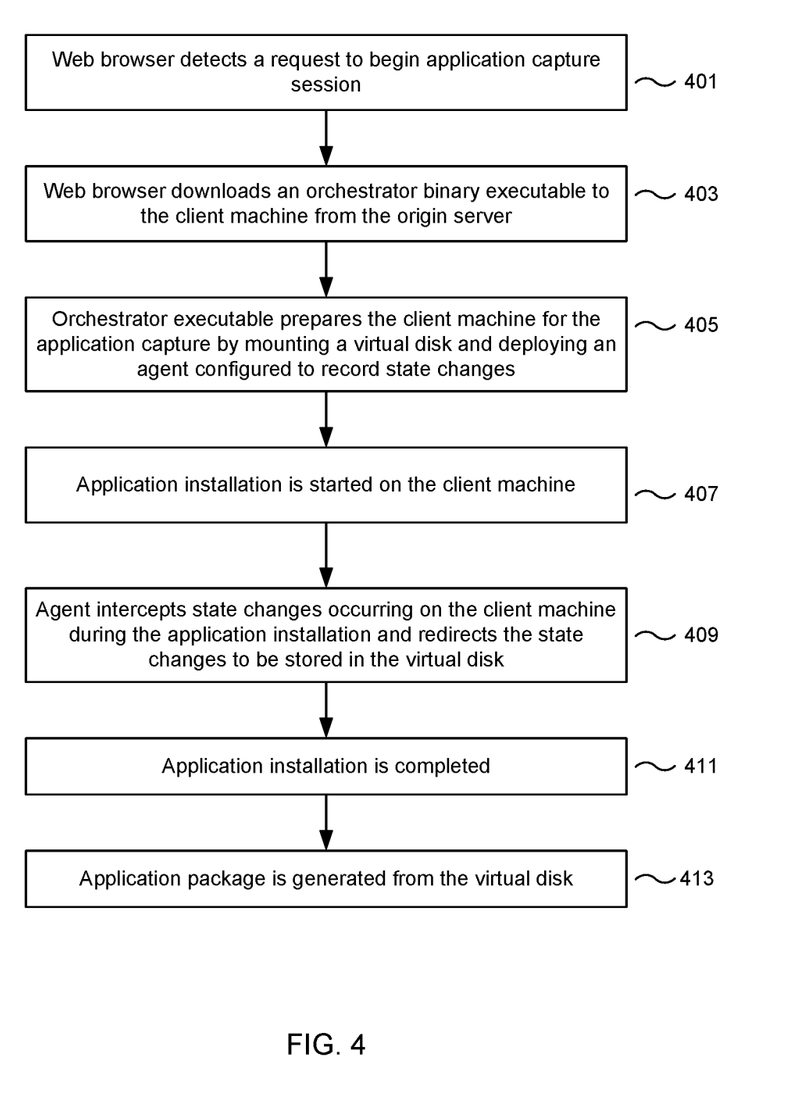
FIG. 4 illustrates an example of the process for performing browser-driven application capture, in accordance with various embodiments.

FIG. 4 illustrates an example of the process for performing browser-driven application capture, in accordance with various embodiments. The process can begin when the web browser detects a request to begin the application capture session, as shown in operation 401. The browser then downloads an orchestrator binary executable to the client machine from the origin server, as shown in operation 403. In operation 405, the orchestrator executable then prepares the client machine for the application capture by performing a number of steps, including mounting a virtual disk, creating the necessary registry state, launching a web server on the client machine that will communicate status updates with the browser, and deploying an agent that will be responsible for recording state changes on the client machine that occur during the application installation.

In operation 407, the application installation is started on the client machine. This can be initiated by the user executing the installer associated with the application. In operation 409, during the application installation process, the agent intercepts state changes occurring on the client machine and redirects the state changes to the stored on the virtual disk. When the application installation process is complete (operation 411), the application package is generated from the virtual disk, as shown in operation 413 by adding the necessary identity and metadata information to the virtual disk.

The various embodiments described above provide a number of advantages over previous methods of capturing application installations. To begin with, no prior software or artifacts need to be manually installed, configured and executing on the capture machine. Furthermore, because all-of-the control and execution are local to the client machine, no complex server-side control and monitoring software, and network-mounted or hypervisor-attached storage, is required for managing the capture process. The constitution, construction and execution of the orchestrator executable is designed to effect a self-propelled launch from a browser webpage, without browser-specific plugins or extensions. The self-bootstrapping and self-extracting code embodied in the orchestrator executable, in turn, clones and spawns an execution monitor that coordinates the capture session between itself, the web browser and the recently activated parts of the agent. User-interface, feedback and user control, including cancellation, is effected through a standard browser webpage. In addition, the capture can be performed on any client machine type, that is, the client machine may be a physical computer or a virtual machine hosted on a hypervisor.

Figure 7:
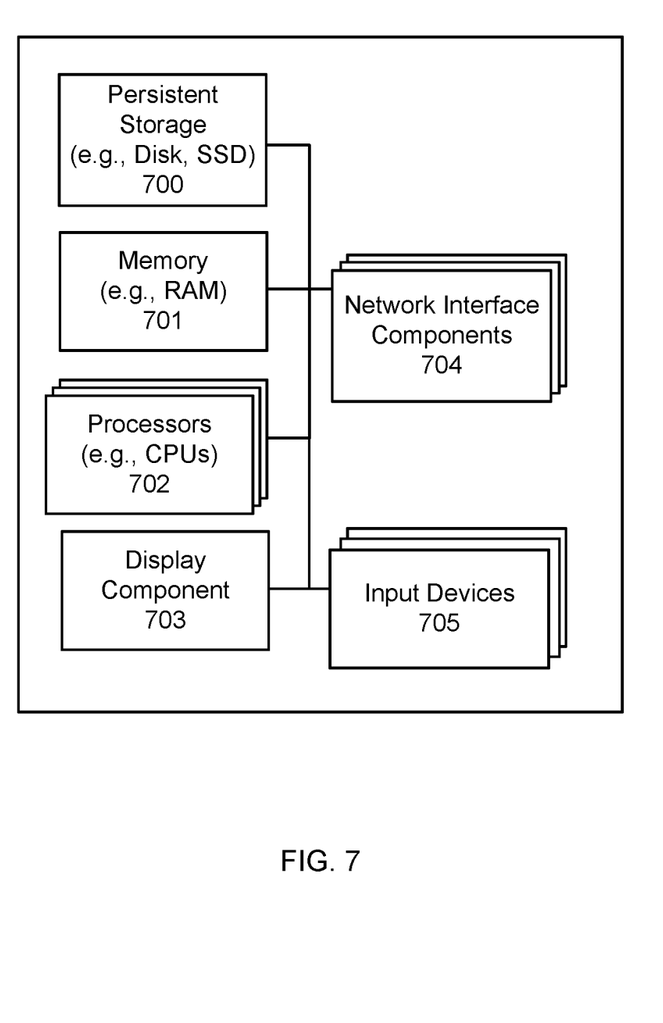
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in a storage medium component. The storage medium can include many types of memory, persistent data storage, or non-transitory computer-readable storage media. For example, the storage medium may take the form of random-access memory (RAM) 701 storing program instructions for execution by the processor(s) 702, a persistent storage (e.g., disk or SSD) 700, a removable memory for sharing information with other devices and/or the like. The computing device typically can further comprise a display component 703, such as a monitor, a touch screen, liquid crystal display (LCD), or the like. In various embodiments, the computing device will include at least one input device 705 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for performing a capture of an application installation, the method comprising:
    receiving a request to capture the application installation on a client machine;
    mounting a virtual disk on the client machine;
    deploying an agent configured to record state changes on the client machine;
    executing a script to create a registry state required for capturing the application installation;
    registering and activating a file system driver and a system-service daemon that comprise the agent, wherein the file system driver is configured to intercept filesystem and registry operations occurring during the application installation and redirecting and storing the filesystem and registry operations to the virtual disk,
    detecting that the application installation has started on the client machine;
    intercepting the state changes occurring on the client machine during the application installation by the agent; and
    redirecting the state changes to be stored in the virtual disk mounted on the client machine.

2. The method of claim 1, further comprising:
    determining that the application installation is complete; and
    generating an application package from the virtual disk, wherein the application package is deployable to execute the application on computing devices different from the client machine.

3. The method of claim 2, further comprising:
    in response to receiving the request to capture the application installation, downloading an orchestrator binary executable to the client machine from an origin server, the orchestrator binary executable configured to prepare the client machine for capturing the application installation.

4. The method of claim 3, wherein determining that the application installation is complete further comprises:
    restarting the client machine;
    launching the orchestrator binary executable after the client machine is restarted;
    detecting, by the orchestrator binary executable, that the application capture session is in progress; and
    generating the application package from the virtual disk by adding identity and metadata information to the application package.

5. The method of claim 3, wherein preparing the client machine for capturing the application installation further comprises:
    launching a web server on the client machine, the web server configured to communicate with the web browser on the client machine in order to orchestrate the application capture session.

6. The method of claim 5, wherein the web server is further configured to:
    receive a script request from the web browser;
    return a response containing a script executable on the web page displayed by the web browser, the script configured to convey status messages related to the state changes occurring during the application capture session to the web browser.

7. The method of claim 2, further comprising:
    deploying the application package to a second client machine by mounting the virtual disk to the second client machine, wherein the application is executable on the second client machine without executing an installer of the application on the second client machine.

8. A computing system, comprising:
    at least one processor; and
    memory including instructions that, when executed by the at least one processor, cause the computing system to perform the operations of:
        receiving a request to capture the application installation on a client machine;
        mounting a virtual disk on the client machine;
        deploying an agent configured to record state changes on the client machine;
        executing a script to create a registry state required for capturing the application installation;
        registering and activating a file system driver and a system-service daemon that comprise the agent, wherein the file system driver is configured to intercept filesystem and registry operations occurring during the application installation and redirecting and storing the filesystem and registry operations to the virtual disk,
        detecting that the application installation has started on the client machine;
        intercepting the state changes occurring on the client machine during the application installation by the agent; and
        redirecting the state changes to be stored in the virtual disk mounted on the client machine.

9. The computing system of claim 8, wherein the memory further comprises instructions that, when executed by the at least one processor, cause the computing system to perform the operations of:
    determining that the application installation is complete; and
    generating an application package from the virtual disk, wherein the application package is deployable to execute the application on computing devices different from the client machine.

10. The computing system of claim 9, wherein the memory further comprises instructions that, when executed by the at least one processor, cause the computing system to perform the operations of:
    in response to receiving the request to capture the application installation, downloading an orchestrator binary executable to the client machine from an origin server, the orchestrator binary executable configured to prepare the client machine for capturing the application installation.

11. The computing system of claim 10, wherein determining that the application installation is complete further comprises:
    restarting the client machine;
    launching the orchestrator binary executable after the client machine is restarted;

detecting, by the orchestrator binary executable, that the application capture session is in progress; and generating the application package from the virtual disk by adding identity and metadata information to the application package.

12. The computing system of claim 10, wherein preparing the client machine for capturing the application installation further comprises:

launching a web server on the client machine, the web server configured to communicate with the web browser on the client machine in order to orchestrate the application capture session.

13. The computing system of claim 12, wherein the web server is further configured to:

receive a script request from the web browser;

return a response containing a script executable on the web page displayed by the web browser, the script configured to convey status messages related to the state changes occurring during the application capture session to the web browser.

14. A non-transitory computer readable storage medium comprising one or more sequences of instructions, the instructions when executed by one or more processors causing the one or more processors to execute the operations of:

receiving a request to capture the application installation on a client machine;

mounting a virtual disk on the client machine;

deploying an agent configured to record state changes on the client machine;

executing a script to create a registry state required for capturing the application installation;

registering and activating a file system driver and a system-service daemon that comprise the agent, wherein the file system driver is configured to intercept filesystem and registry operations occurring during the application installation and redirecting and storing the filesystem and registry operations to the virtual disk, detecting that the application installation has started on the client machine;

intercepting the state changes occurring on the client machine during the application installation by the agent; and redirecting the state changes to be stored in the virtual disk mounted on the client machine.

15. The non-transitory computer readable storage medium of claim 14, further comprising instructions executed by one or more processors, causing the one or more processors to execute the operations of:

determining that the application installation is complete; and generating an application package from the virtual disk, wherein the application package is deployable to execute the application on computing devices different from the client machine.

16. The non-transitory computer readable storage medium of claim 15, further comprising instructions executed by one or more processors, causing the one or more processors to execute the operations of:

in response to receiving the request to capture the application installation, downloading an orchestrator binary executable to the client machine from an origin server, the orchestrator binary executable configured to prepare the client machine for capturing the application installation.

17. The non-transitory computer readable storage medium of claim 16, wherein determining that the application installation is complete further comprises:

restarting the client machine;

launching the orchestrator binary executable after the client machine is restarted;

detecting, by the orchestrator binary executable, that the application capture session is in progress; and generating the application package from the virtual disk by adding identity and metadata information to the application package.

18. The non-transitory computer readable storage medium of claim 16, wherein preparing the client machine for capturing the application installation further comprises:

launching a web server on the client machine, the web server configured to communicate with the web browser on the client machine in order to orchestrate the application capture session.

19. The non-transitory computer readable storage medium of claim 18, wherein the web server is further configured to:

receive a script request from the web browser;

return a response containing a script executable on the web page displayed by the web browser, the script configured to convey status messages related to the state changes occurring during the application capture session to the web browser.

* * * * *